United States Patent [19]
Katz

[11] 3,903,719
[45] Sept. 9, 1975

[54] BICYCLE LOCK ASSEMBLY
[76] Inventor: Harold Katz, 8851 S. Broadway, Los Angeles, Calif. 90003
[22] Filed: Aug. 2, 1974
[21] Appl. No.: 494,040

[52] U.S. Cl. .................... 70/227; 70/234; 242/84.8
[51] Int. Cl.² ..................... B62H 5/16; E05B 71/00
[58] Field of Search ........... 70/30, 49, 58, 227, 233, 70/234; 242/84.8, 100, 100.1

[56] References Cited
UNITED STATES PATENTS

| 101,442 | 4/1870 | Donnellan | 242/84.8 |
| 642,727 | 2/1900 | Smith | 242/84.8 |

FOREIGN PATENTS OR APPLICATIONS

| 802,885 | 9/1936 | France | 70/234 |
| 866,462 | 8/1941 | France | 70/234 |
| 429,509 | 1/1948 | Italy | 70/234 |

Primary Examiner—Albert G. Craig, Jr.
Attorney, Agent, or Firm—Jessup & Beecher

[57] ABSTRACT

An improved bicycle lock assembly is provided by which a bicycle can be readily attached to a post, or the like, so as to prevent theft. The lock assembly may be constructed of four interfitting plastic parts which form a manually operated rotor in a housing, and a clamp for mounting the housing to the frame of a bicycle. A retractable cable is coiled about the rotor. The cable may be pulled out from the housing and looped around the post and/or through the spokes of the wheel of the bicycle, and then padlocked to itself. When the cable is unlocked, it may be retracted into the housing by manually turning a knob which is integral with the rotor, and which protrudes through one side of the housing.

5 Claims, 5 Drawing Figures

PATENTED SEP 9 1975                3,903,719

BICYCLE LOCK ASSEMBLY

BACKGROUND OF THE INVENTION

Copending application Ser. No. 227,930 which was filed Feb. 22, 1972, in the name of the present inventor describes an improved bicycle lock by which a bicycle can be readily attached to a post, or the like, so as to prevent theft. The lock assembly described in the copending application includes a retractable cable which is mounted on a spring loaded reel, or the like, in an appropriate housing. The housing is clamped to the frame of the bicycle in any suitable position. A lock is provided in the housing in one embodiment described in the copending application, and the tip of the cable may be inserted into the lock and locked in place after the cable has been looped around the post.

The assembly of the present invention is of the same general type as the lock described in the copending application. The lock assembly of the invention, however, is conceived so as to be more simple in its construction and operation, and more readily susceptible for commercial manufacture from high-impact plastic material, or other suitable materials.

As mentioned above, the improved lock assembly of the invention, in the embodiment to be described, is formed of four parts, namely a housing having a opening in one side, a rotor having a integral knob which protrudes through the opening in the housing when the rotor is fitted into the housing, the knob having a inner flange to hold the rotor in the housing, and which forms a bearing for the rotor as the flange engages the edge of the aperture in the housing; a cover section which is sealed to the housing and which enclosed the opposite side of the housing; and a clamp member which serves to clamp the housing on, for example, the upright tube of the bicycle frame.

A cable is mounted on the rotor, and the cable may be retracted into the housing merely by manually turning the protruding knob of the rotor. The cable may be pulled out of the housing, as explained above, and looped around a post and/or through the spokes of the bicycle wheel. The end of the cable may then be padlocked to the cable itself, so that the cable may be held securely in the locked position. Then, when the cable is unlocked, it may be retracted into the housing merely by manually turning the protruding rotor knob.

DETAILED DESCRIPTION OF THE ILLUSTRATED EMBODIMENT

The lock assembly of the invention, in the embodiment illustrated in FIGS. 1–5, is designated generally as 10, and the assembly is shown as mounted on the upright tube A of a bicycle frame B, directly under the upper bar of the frame.

Figure 5:
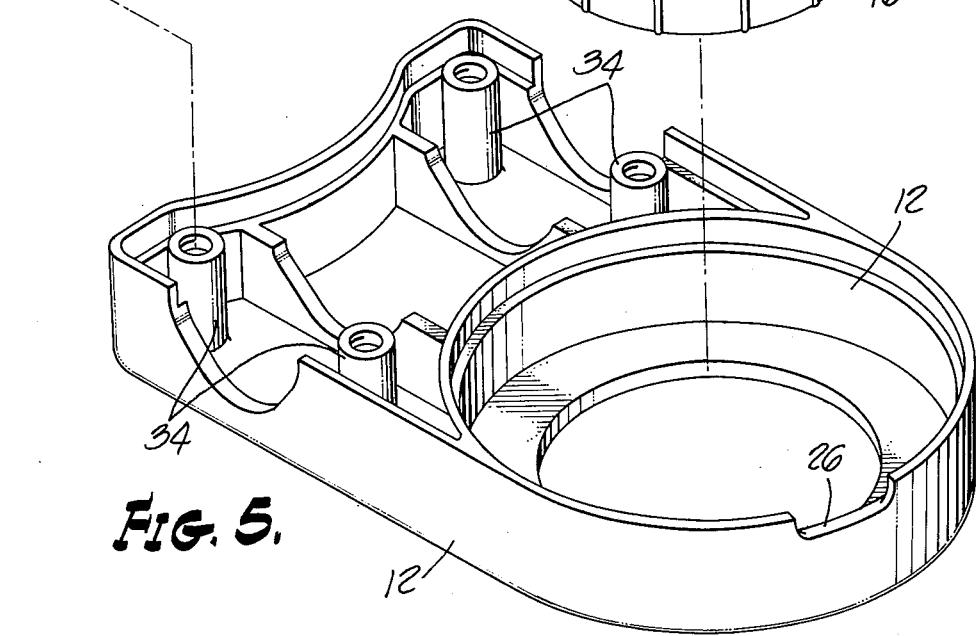
FIG. 5 is a perspective exploded view of the assembly, showing the four components which make up the assembly, in the illustrated embodiment.

The lock assembly 10 includes a housing 12 having a configuration which is best shown in FIG. 5. As mentioned above, the housing 12, and the other components of the assembly may be formed of high impact palstic material, or other appropriate material.

Figure 3:
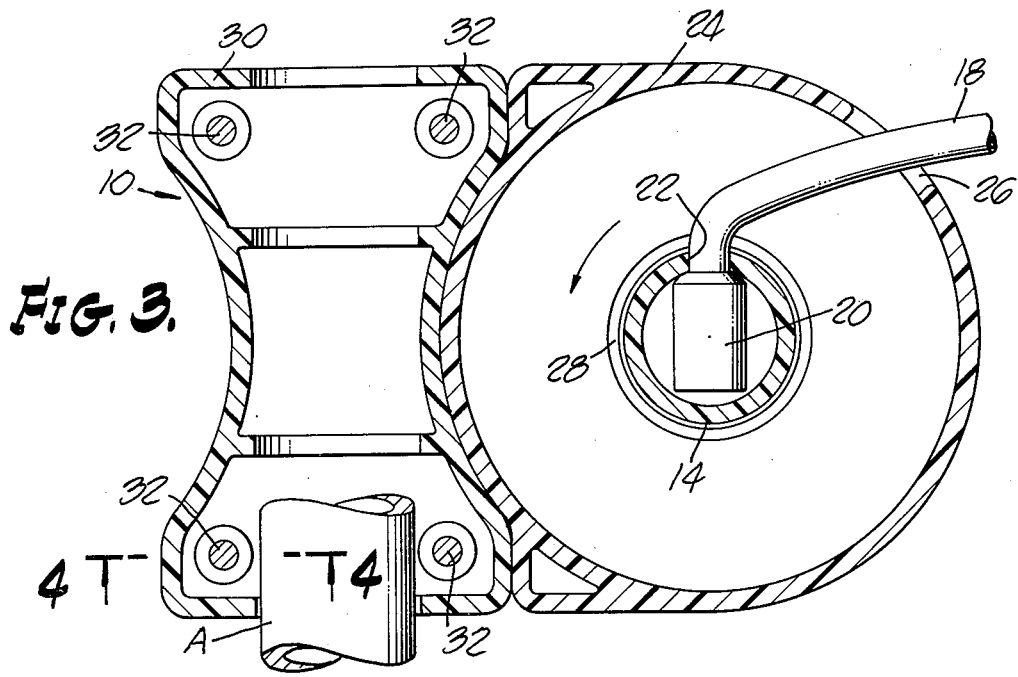
FIG. 3 is a sectional view taken essentially along the line 3—3 of FIG. 1.
Figure 4:
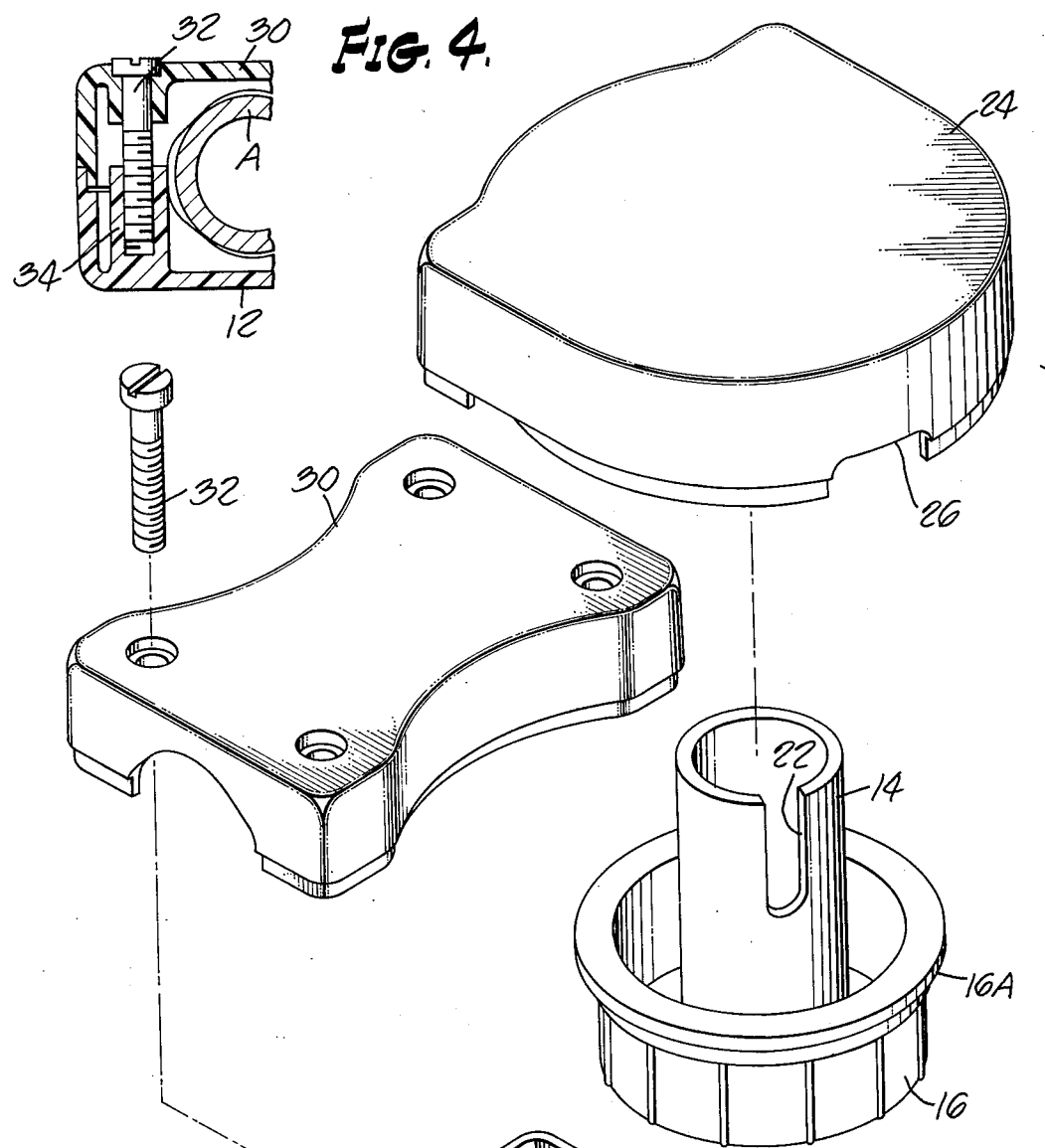
FIG. 4 is a section taken along the line 4—4 of FIG. 3.

A rotor 14 is fitted into the housing 12, with an integral knob 16 protruding through a circular opening, or aperture, in the side of the housing. As best shown in FIG. 3, the knob 16 has a flange 16a at its inner end which acts as a bearing surface to support the rotor rotatably within the housing 12. The knob 16 is preferably knurled to facilitate the manual turning of the rotor 14.

A cable 18 formed of flexible steel or other appropriate material has an enlarged end lug 20 which is held in the interior of the rotor 14, with the cable extending through a slot 22 in the rotor. The cable 18 extends through a further slot formed in the edge of the housing 12 and in the mating edge of a corresponding cover member 24, as best shown in FIG. 3, the slot being designated 26 in FIG. 3.

Figure 2:
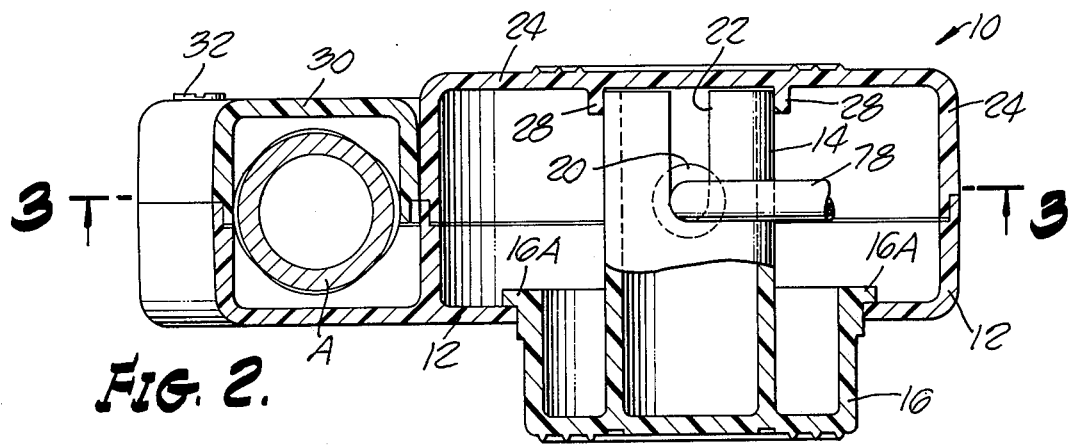
FIG. 2 is a sectional view taken essentially along the line 2—2 of FIG. 1.

The cover 24 has the configuration shown in FIG. 5. The cover is fitted over the open side of the housing 12, and it is sealed to the housing by a plastic weld, or by other appropriate means. The cover provides a further bearing 28 for the other end of the rotor 14, as best shown in FIG. 2. It will be understood that when the assembly is sealed to the condition shown in FIG. 2, the cable 18 may be reeled onto the rotor 14 by manually turning the protruding knob 16.

The housing 12 also defines a further section on the left-hand end in FIG. 2 which receives the tube A of the bicycle, and the housing is clamped to the tube A by a clamp 30, having the configuration shown in FIG. 5, and by means, for example, of four screws, such as the screw 32. These screws extend through mounting holes in the clamp 30 and into threaded bosses 34 formed in the housing 12, as shown in FIG. 5. The screws 32 may be of the type such that they can be screwed into the bosses 34, but have a tapered head-slot configuration to prevent their being unscrewed out of the bosses. In this way, the clamp serves to clamp the housing onto the tube A of the bicycle, as shown in FIG. 1.

Figure 1:
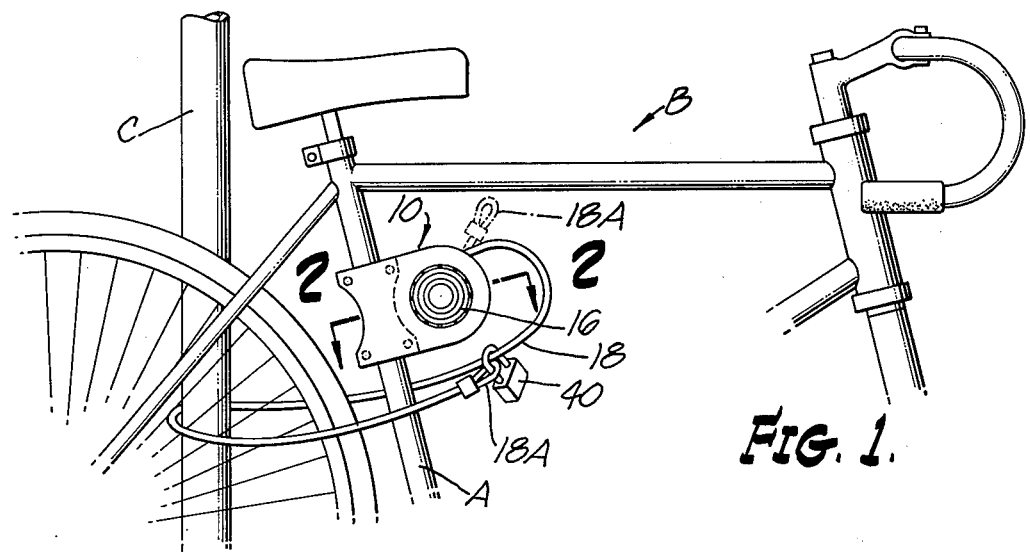
FIG. 1 is a fragmentary view of a bicycle frame, and showing a locking assembly embodying the invention in one of its aspects, the assembly being clamped to the upright tube of the bicycle frame directly under the upper bar of the frame.

As shown in FIG. 1, the bicycle may be locked to a post, such as a post C, merely by pulling the cable 18 out of the housing, and by looping the cable around the post and through the spokes of a wheel of the bicycle. A looped end 18a is provided for the cable, which may be padlocked to the cable by means, for example, of a padlock 40. When the padlock 40 is unlocked, the cable 18 may be retracted into the housing by manually turning the knob 16.

It is apparent that while the lock assembly of the invention has been described for use in conjunction with a bicycle, it may be adapted for use in conjunction with other types of vehicles. The principal objective of the invention is to provide an improved lock which may be conveniently clamped to an appropriate part of the vehicle, and which is normally relatively small in size and unobtrusive. The lock of the invention achieves this objective, and it also has a feature in that it may be manufactured simply and inexpensively, and it is composed of a relatively few components which are interfitted into one another to constitute a sturdy, rugged, and reliable lock assembly.

It will be appreciated, of course, that while a particular embodiment of the invention has been shown and described, modifications may be made. It is intended in the following claims to cover all the modifications which come within the spirit and scope of the invention.

What is claimed is:

1. A lock assembly to be mounted on a bicycle, or the like, said bicycle including a frame formed of tubular members, said lock assembly including: an elongated housing having a circular opening in one side thereof adjacent one of its ends; a rotor rotatably mounted in the housing coaxial with said circular opening and having an integral coaxial knob protruding through the opening in the housing, said knob having an inner flange engaging the inner surface of the housing around the circular opening therein to retain the rotor in the housing and to form a bearing surface for the rotor; a cover mounted on the other side of the housing adjacent the aforesaid one of its ends and having an annular ridge on the inner surface thereof coaxial with the opening in the housing, said ridge forming a bearing for rotatably receiving the end of the rotor remote from the operating knob; a clamp mounted on the other side of the housing adjacent said cover and at a position displaced from the rotor for mounting the housing on one end of the tubular members of the bicycle with the tubular member extending transversely through the housing and clamp through slots in the edges thereof.

2. The lock assembly defined in claim 1, in which the cable has a looped end portion which may be padlocked to the remaining part of the cable.

3. The lock assembly defined in claim 1, in which the cable has an enlarged end lug at the inner end thereof, and the rotor is a hollow tubular member having a slot therein for receiving the end lug of the cable.

4. The lock assembly defined in claim 1, in which the cover and housing are formed of high impact plastic material and are welded to one another at the mating edges thereof by a plastic weld.

5. The lock assembly defined in claim 4, in which the other end of the housing has integral threaded bosses therein formed of high impact plastic material, and which includes a plurality of mounting screws extending through the clamp and into the threaded bosses for mounting the clamp on the housing.

* * * * *